(12) United States Patent
Kurtz et al.

(10) Patent No.: US 8,631,707 B2
(45) Date of Patent: Jan. 21, 2014

(54) DIFFERENTIAL TEMPERATURE AND ACCELERATION COMPENSATED PRESSURE TRANSDUCER

(75) Inventors: Anthony D. Kurtz, Saddle River, NJ (US); Alexander Ned, Kinnelon, NJ (US); Sorin Stefanescu, New Milford, NJ (US); Nora Kurtz, Saddle River, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 453 days.

(21) Appl. No.: 12/751,482

(22) Filed: Mar. 31, 2010

(65) Prior Publication Data

US 2011/0239772 A1    Oct. 6, 2011

(51) Int. Cl.
*G01L 9/10* (2006.01)
*G01L 15/00* (2006.01)
*G01L 7/08* (2006.01)

(52) U.S. Cl.
USPC .................. 73/721; 73/716; 73/715; 29/592.1

(58) Field of Classification Search
USPC .................... 73/721, 716, 715, 717, 719, 720
See application file for complete search history.

(56) References Cited

U.S. PATENT DOCUMENTS

| | | | | |
|---|---|---|---|---|
| 4,025,942 A * | 5/1977 | Kurtz | ........................... | 257/417 |
| 4,222,277 A * | 9/1980 | Kurtz et al. | ..................... | 73/721 |
| 4,236,137 A * | 11/1980 | Kurtz et al. | ........................ | 338/4 |
| 4,790,192 A * | 12/1988 | Knecht et al. | ..................... | 73/721 |
| 5,187,985 A * | 2/1993 | Nelson | ............................ | 73/708 |
| 5,286,671 A * | 2/1994 | Kurtz et al. | ...................... | 438/50 |
| 5,955,771 A * | 9/1999 | Kurtz et al. | ..................... | 257/419 |
| 6,293,154 B1 * | 9/2001 | Kurtz | ............................. | 73/727 |
| 7,183,620 B2 * | 2/2007 | Kurtz et al. | .................. | 257/419 |
| 7,331,241 B1 * | 2/2008 | Kurtz et al. | ..................... | 73/753 |
| 7,360,429 B1 * | 4/2008 | Filippelli | ........................ | 73/715 |
| 7,436,037 B2 * | 10/2008 | Kurtz et al. | .................... | 257/419 |
| 7,458,275 B2 * | 12/2008 | Kleven et al. | ................... | 73/756 |
| 7,673,518 B2 * | 3/2010 | Kurtz | ............................ | 73/716 |
| 7,762,139 B2 * | 7/2010 | Kurtz et al. | ...................... | 73/714 |
| 7,775,117 B2 * | 8/2010 | Kurtz | ............................. | 73/721 |
| 7,866,215 B2 * | 1/2011 | Kurtz | ............................. | 73/721 |
| 7,874,216 B2 * | 1/2011 | Kurtz et al. | ...................... | 73/716 |
| 8,024,976 B2 * | 9/2011 | Kurtz et al. | ...................... | 73/713 |
| 2003/0107096 A1 * | 6/2003 | Kurtz et al. | .................. | 257/414 |

* cited by examiner

*Primary Examiner* — Lisa Caputo
*Assistant Examiner* — Jonathan Dunlap
(74) *Attorney, Agent, or Firm* — Troutman Sanders LLP; James E. Schutz; Edward M. Roney

(57) ABSTRACT

A dual diaphragm pressure transducer, or sensor, with compensation for non-pressure effects is disclosed. The pressure sensor can include two pressure transducers located on separate portions of a chip. The first pressure transducer can be a differential pressure transducer, which produces a signal proportional to one or more applied pressures and includes other non-pressure effects. The second pressure transducer can be sealed in a hermetic chamber and thus can produce a signal proportional only to non-pressure effects. The signals can be combined to produce a signal proportional to the applied pressures with no non-pressure effects. The first and second pressure transducers can be physically and/or electrically isolated to improve sealing between the two pressure transducers and prevent pressure leaks therebetween.

17 Claims, 10 Drawing Sheets

DIFFERENTIAL TEMPERATURE AND ACCELERATION COMPENSATED PRESSURE TRANSDUCER

TECHNICAL FIELD

Embodiments of the present invention relate generally to pressure transducers, and more specifically to a dual diaphragm compensated differential pressure sensor with physically and/or electrically isolated diaphragms.

BACKGROUND

Pressure sensors, usually in the form of a transducer, are widely used in a variety of fields. Pressure transducers are used in sensors for automotive applications to measure, among other things, oil pressure, water pressure, and manifold absolute pressure. Pressure transducers can be assembled in a variety of configurations, but generally involve some form of piezo element.

A piezo element can be a piezoresistive element or a piezoelectric element. A piezoresistive element is an element that produces a change in resistance in response to an applied force. In contrast, a piezoelectric element produces an electrical current in response to an applied force. Either type of element can be used to generate a signal proportional to the applied force by measuring the change in resistance or voltage, as applicable. In a piezoresistive element, or piezoresistor, for example, as the force is applied the resistance of the element changes, which produces a proportional change in a reference voltage applied to the piezoresistor. The force applied can then be calculated from this change in the reference voltage.

In one configuration, a pressure transducer can comprise a flexible diaphragm fitted with one or more piezo elements. When pressure is applied to the diaphragm, the diaphragm deflects. This deflection, in turn, places the piezo elements mounted thereon under compression or tension, depending on their location on the diaphragm, effectively measuring the deflection of the diaphragm. This method can be used to measure the difference between two pressures applied to opposite sides of the diaphragm (differential pressure) or an applied pressure on one side and a reference pressure on the other side (absolute pressure).

This type of sensor does not compensate for outside forces (i.e., forces other than pressure) acting on the diaphragm. When used in a jet engine, for example, the sensor can be exposed to significant heat, vibration, and acceleration. A portion of the change in the piezo elements, therefore, can be caused by these outside forces resulting in inaccurate measurements.

One solution to this problem, as illustrated in U.S. Pat. No. 6,293,154 ("the '154 patent"), assigned to Kulite Semiconductor Products, Inc. (the Applicant herein) is to provide a correction for this error using a second, hermetically sealed diaphragm that is substantially colocated with the differential or absolute pressure diaphragm. The second diaphragm is enclosed in a hermetically sealed chamber with equal pressure on both sides of the diaphragm. Piezoresistors are fitted to both diaphragms to measure their deflection.

In this configuration, the deflection of the second diaphragm due to pressure is substantially zero and any change in resistance in the piezoresistors mounted thereon is the result of, for example, vibration, heat, and/or hysteresis only (i.e., "non-pressure effects"). The signal from the second diaphragm can be subtracted from the signal from the first diaphragm, which inherently includes changes in resistance due to both pressure and non-pressure effects, producing a signal that is proportional only to pressure.

When the pressure sensor is an absolute pressure sensor the method set forth in the '154 patent works very well because the cavity under both diaphragms is at a sealed reference pressure. However, when the sensor is to be a differential or gauge sensor, it is necessary to expose the back side of the pressure sensitive diaphragm to a second pressure while still maintaining a sealed reference pressure on the non-pressure sensitive diaphragm. This sealed pressure is necessary on the non-pressure sensitive diaphragm so that it does not respond to any outside change in pressure. Conventionally, the piezoresistors mounted on the first diaphragm and the piezoresistors mounted on the second diaphragm were internally connected and shared common terminals. As explained in more detail below, these common connections make it difficult to achieve and maintain a hermetic seal on the chip.

SUMMARY

Embodiments of the present invention relate to a compensated differential pressure sensor. The sensor can comprise two separate diaphragms disposed on the same chip. The first diaphragm, or active diaphragm, can be exposed to the pressure or pressures to be measured. The second diaphragm, or reference diaphragm, can be disposed in a hermetically sealed chamber such that an equal reference pressure exists on both sides of the diaphragm. In this configuration, the reference diaphragm deflects in reaction only to non-pressure effects such as for example and not limitation, heat, vibration, and hysteresis.

The first and second diaphragms can include piezoresistive elements, or piezoresistors, which vary in resistance in an amount proportional to the deflection of the respective diaphragms. This change in resistance can be used to create signals (e.g., changes in voltage) proportional to the deflection. The signal from the piezoresistors on the active diaphragm, therefore, can generate a signal proportional to both the applied pressure and non-pressure effects. The signal from the piezoresistors on the reference diaphragm, on the other hand, can generate a signal proportional only to non-pressure effects due to the hermetically sealed chamber. These signals can be combined (i.e., subtracted) to generate an output proportional only to the deflection of the active diaphragm, with non-pressure effects removed.

In most instances, the two diaphragms will be at disparate pressures (i.e., the applied pressure will be different than the reference pressure). It is desirable, therefore, to avoid any pressure leaks between the two diaphragms as such leaks may skew the output signals from the piezoresistors. To this end, a bridge, or seal, can be provided on the chip between the two diaphragms to prevent pressure leaks therebetween.

Embodiments of the present invention can comprise a pressure sensor comprising a chip with a first pressure sensing device disposed on a first portion of the chip and a second pressure sensing device disposed on a second portion of the chip. In some embodiments, a bridge can be disposed between the first pressure sensing device and the second pressure sensing device. The bridge can provide a seal onto which a contact glass can be bonded. The bridge can prevent leaks between the first pressure sensing device and the second pressure sensing device. In some embodiments, the bridge can be a P+ sealing pattern on the chip.

In some embodiments, the first sensor can be a differential pressure sensor and the second pressure sensing device can comprise a reference pressure sensor. The differential pressure sensor can measure an applied pressure or pressures, along with non-pressure effects. The reference pressure sensor is preferably isolated from external pressures and measures only non-pressure effects. The signal from each sensor can be combined in a Wheatstone bridge to output a signal proportion to the applied pressure(s), with no non-pressure effects.

In some embodiments, the chip can further comprise a first set of three contacts disposed on the chip and electrically connected to the first pressure sensor to form a first half of an isolated Wheatstone bridge. Similarly the chip can comprise a second set of three contacts disposed on the chip and electrically connected to the second pressure sensor to form a second half of the isolated Wheatstone bridge. In this manner, the two pressure sensors can be electrically isolated. The two halves of the Wheatstone bridge can be combined externally to the chip to output the desired signal.

In some embodiments, the chip can further comprise one or more isolation moats. The isolation moats can be grooves or channels in the chip between the two pressure sensors. The isolation moat can physically isolate the first pressure sensing device from the second pressure sensing device to minimize interaction between the two sensors.

In some embodiments, the pressure sensors can be connected on the chip using an interconnect. In this configuration, the chip can further comprise a P+ sealing pattern disposed as a high resistance interconnect. The P+ sealing pattern can provide a sealing surface for the contact glass that covers the chip. This can prevent pressure leaks between the differential sensor and the reference sensor. The P+ sealing pattern can form a substantially smooth surface onto which the contact glass is bonded. This can prevent pressure leaks between the first and second deflectable diaphragms. In some embodiments, the first and second deflectable diaphragms can comprise thinned areas in the chip.

In an alternative embodiment, rather than using a P+ layer to form a seal on the chip, the chip can be subjected to an extra long oxidizing step. In this manner a non-conductive oxide layer can be formed to seal gaps between the first and second deflectable diaphragms. The non-conductive oxide layer can provide a smooth, continuous surface onto which the contact glass can be bonded and prevent pressure leaks between the diaphragms. In some embodiments, the interconnects can comprise narrow areas to improve sealing by the non-conductive oxide layer.

The foregoing and other objects, features, aspects, and advantages of the present invention will become more apparent from the following detailed description of the present invention when taken in conjunction with the accompanying drawings.

DETAILED DESCRIPTION

Generally, the device according to the present invention can include a single "chip" or piece of silicon containing at least two stress deflecting diaphragms that are physically and/or electrically isolated. The diaphragms are equipped with a means to measure their deflection. They may be equipped with, for example and not limitation, piezoresistive elements or piezoelectric elements. For ease of explanation, embodiments of the present invention will be described below with reference to piezoresistive elements, or "piezoresistors." The use of other suitable means, such as piezoelectric elements is nonetheless expressly contemplated.

The two diaphragms are disposed on the same chip, but are exposed to different pressures. The first diaphragm, or "active" diaphragm, can be exposed to the pressure, or pressures, to be measured. The second diaphragm, or "reference" diaphragm, can be disposed in an sealed chamber with equal pressure on both sides. The output of the reference sensor can be subtracted from the output of the active sensor to produce an accurate pressure measurement.

Because the reference diaphragm is not exposed to external pressures, it is desirable to seal any leak paths on the chip between the two diaphragms. The elimination of leak paths between the two diaphragms can be achieved in several ways, to which embodiments of the present invention are primarily directed.

Figure 1:
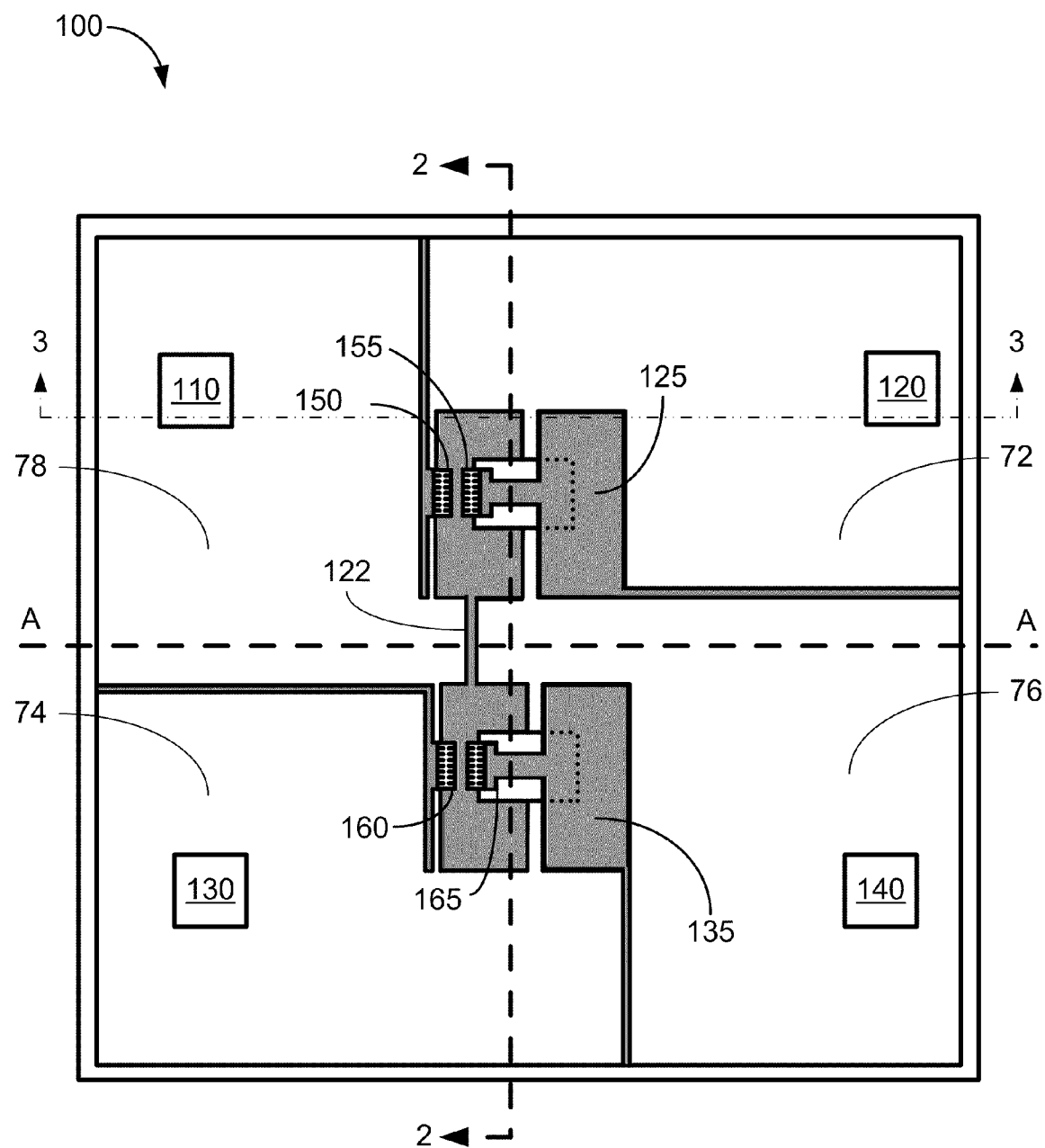
FIG. 1 depicts a schematic of a conventional compensated pressure sensor.
Figure 3:
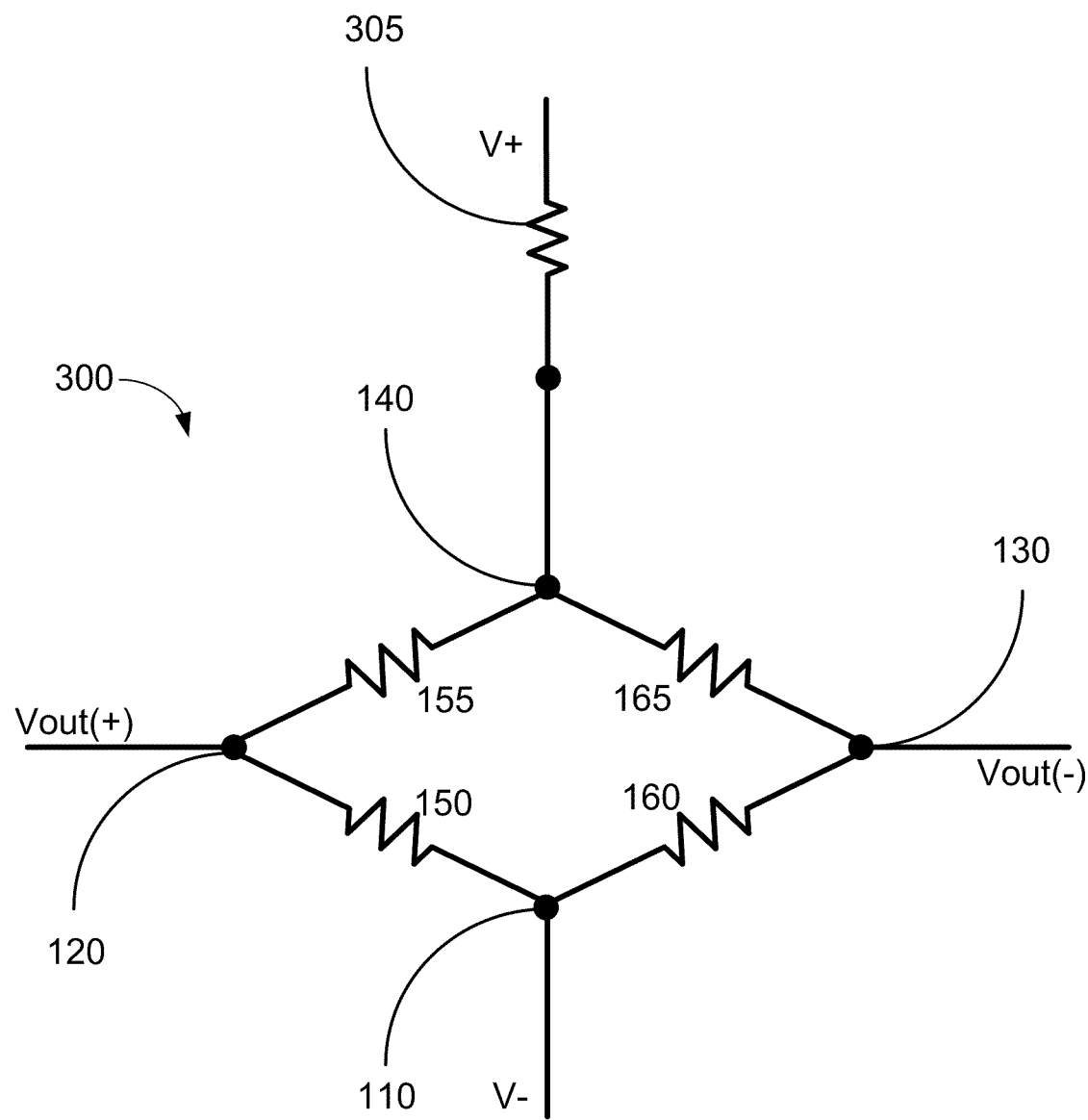
FIG. 3 depicts a wiring diagram for a Wheatstone bridge used in the conventional compensated pressure sensor of FIG. 1.

Referring now to the figures, where like references identify like elements, FIG. 1 illustrates a partial plan-view of a conventional compensated pressure sensing device 100 according to the present invention. In the preferred embodiment, two separate deflectable diaphragms 125, 135 each respectively containing two piezoresistors 150, 155 and 160, 165. The piezoresistors 150, 155, 160, 165 are electrically coupled in series are formed in a wafer 109. Both piezoresistors 150, 160 decrease with positive normal stress and piezoresistors 155, 165 each increase with positive normal stress. The piezoresistors 150, 155, 160, 165 are electrically interconnected 122 to form a full Wheatstone bridge such as is illustrated in FIG. 3.

Figure 2A:
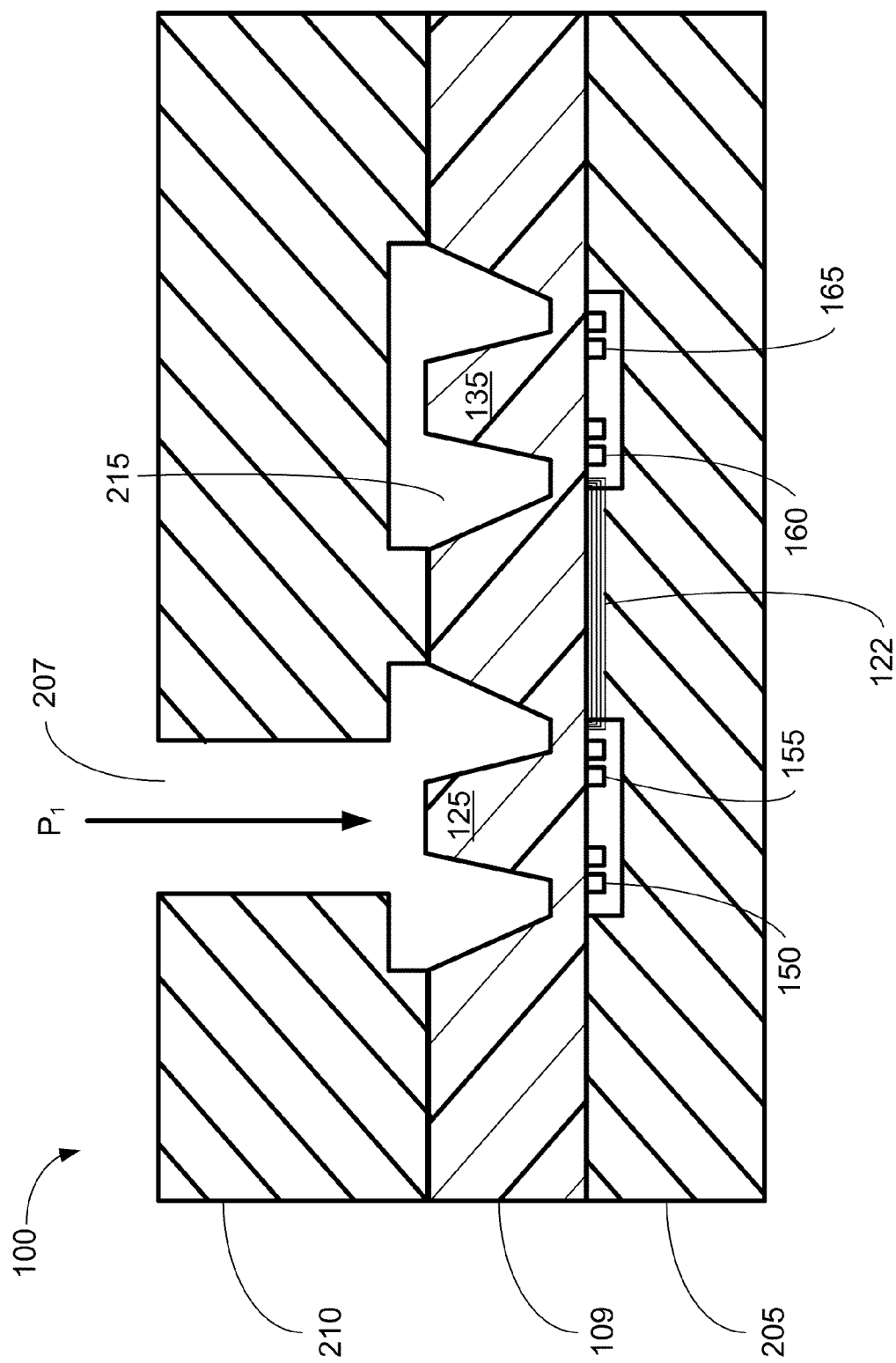
FIGS. 2a, 2b, and 2c depict various cross sectional views of the conventional compensated pressure sensor of FIG. 1.

FIG. 2a illustrates the cross-section 2-2 of the device 100 of FIG. 1. The two deflecting diaphragms 125, 135 are covered by another member 210 which has therein an aperture 207 accessible to the active diaphragm 125 but not the reference diaphragm 135. Thus, application of a pressure $P_1$ on the covering member 210 will cause the active diaphragm 125 to deflect, while the reference diaphragm 135 remains isolated from pressure.

In this configuration, the application of various vibration, acceleration, or stresses other than those caused by pressure ("non-pressure effects") to the device 100 will cause both diaphragms 125, 135 to deflect. If both diaphragms 125, 135 are formed in sufficient proximity to one another, the deflection caused in each of the diaphragms 125, 135 by non-pressure effects will be substantially the same. Thus, the deflection caused by non-pressure effects on the device 100 can be canceled so that the device 100 is responsive to normal pressure applied to the cover 210 only.

Commonly assigned U.S. Pat. No. 5,955,771, entitled "SENSORS FOR USE IN HIGH VIBRATIONAL APPLICATIONS AND METHODS FOR FABRICATING SAME", issued Sep. 21, 1999, the entire disclosure of which is hereby incorporated by reference as if being set forth in its entirety, teaches a hermetically sealed sensor which can be advantageously used with the present invention. It is understood that other structures can be used as well though. The resulting structure will be an ultra-thin sensor suitable for direct mounting to a structure such as a fan blade in a jet engine, for example. Furthermore, such a sensor is suitable for high temperature operation. For instance, such a device could be mounted on an appropriate pre-glazed kovar "shim" and then welded directly to a fan blade of a jet engine for example or to the blade of a helicopter.

The wafer 109 is preferably fabricated using the method disclosed in commonly assigned U.S. Pat. No. 3,930,823, entitled, "HIGH TEMPERATURE TRANSDUCERS AND HOUSING INCLUDING FABRICATION METHODS," the entire disclosure of which is hereby incorporated by reference as if being set forth herein in its entirety. Alternatively, any conventional wafer processing technique that enables dialectically isolated piezoresistive sensor elements 150, 155, 160, 165 to be formed on semiconductor material using dielectric films of $SiO_2$ or the like could be used. The elements 150, 155, 160, 165 are preferably formed of highly doped (P+) silicon. It is understood that a number of such sensors can be made at the same time on a large substrate. The circuit nodes of the Wheatstone bridge include four oversized P+ diffused silicon electrical contact areas or contact areas 72, 74, 76, 78 which are mainly located in non-active areas of the wafer 109. It should be understood the active portions of the wafer 109 can be defined as those portions defined by the diaphragms 125 and 135, as these portions deflect. The remaining portions are referred to as the non-active regions. The term "finger" is used to indicate those areas 72, 74, 76, 78 which project from the piezoresistors 150, 155, 160, 165 to the metal contacts 110, 120, 130, 140. The metal contacts 110, 120, 130, 140 within the contact area are preferably rectangular in shape, although other shapes could be utilized.

Figure 2B:
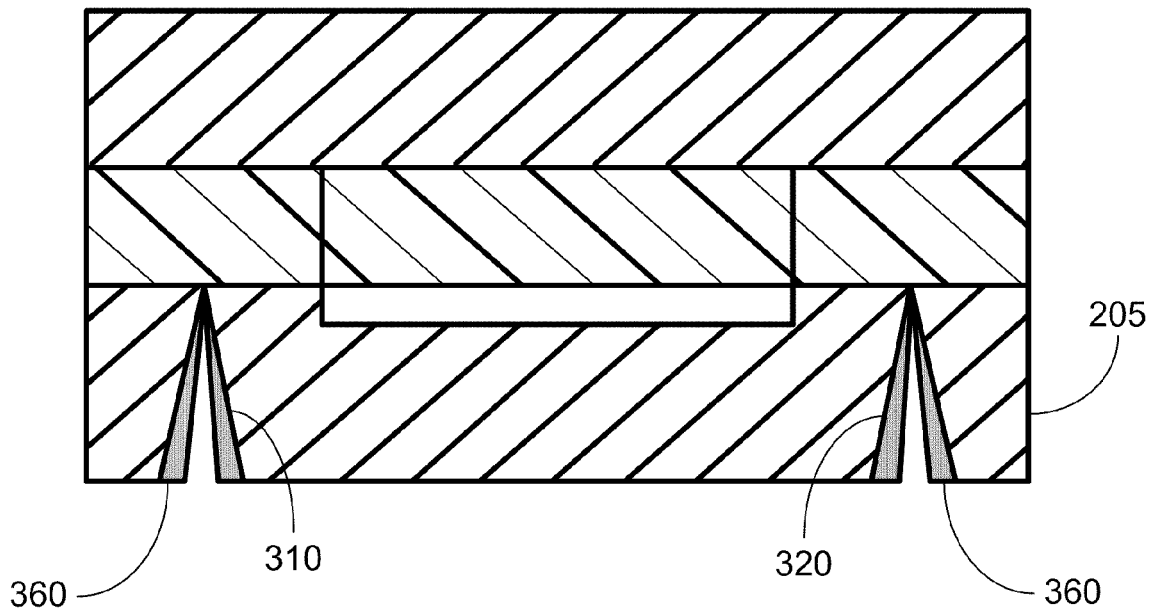
Figure 2C:
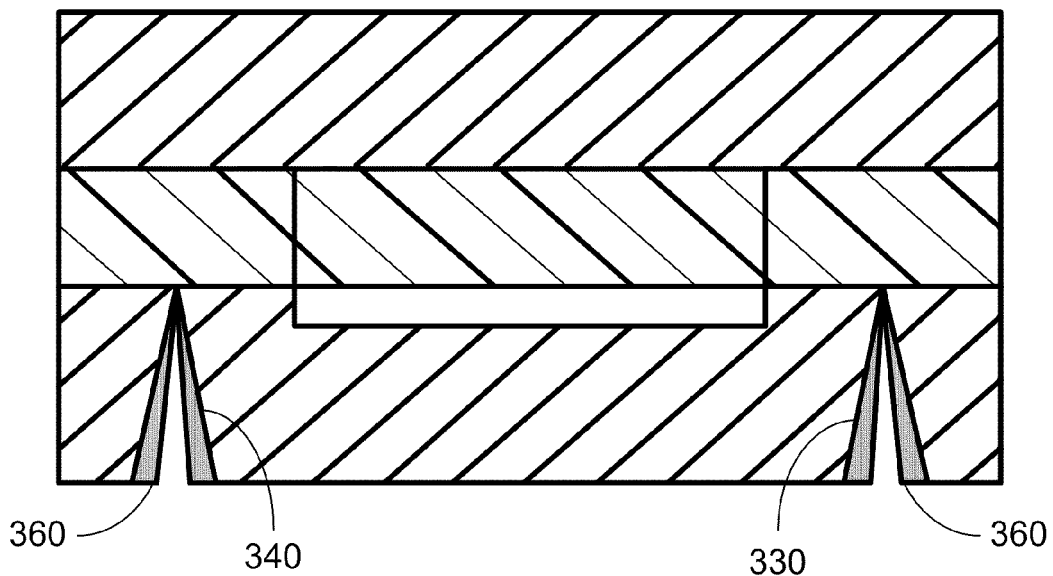

FIGS. 2b and 2c illustrate a cross-section 3-3 of the device 100 of FIG. 1. A contact glass 205 is preferably bonded to and can be used to electrically contact the contact areas 72, 74, 76, 78. The contact glass 205 preferably includes four apertures 310, 320, 330, 340 disposed in areas which will overlie the metalized portions of the contacts 110, 120, 130, 140 when contact glass 205 is secured or bonded to wafer 109. Preferably, apertures 310, 320, 330, 340 on the side of the glass that contact the silicon wafer 109 are just slightly larger than the metalized regions 110, 120, 130, 140 but smaller than the width of the contact areas 72, 74, 76, 78 to insure proper sealing with the wafer 109. The apertures 310, 320, 330 and 340 are preferably tapered in dimension or other shapes can be utilized.

In this case, the contact glass 205 is preferably electrostatically bonded to the silicon wafer 109. The apertures 310, 320, 330 and 340 are preferably filled with an unfired metal glass frit 360. In some embodiments, small spheres or balls of metal are inserted into the unfired frit so as to leave a small portion of each sphere protruding past an outermost edge of the contact glass 205. In some embodiments, pins from the header can extend into the contact holes, which are filled with conductive glass-metal frit. The structure can then be fired to make an electrical contact between the spheres and/or pins and the metalized regions 110, 120, 130, 140 of the contact areas 72, 74, 76, 78. On the other hand, successively filling and firing the glass-metal frits ensures that after firing, the glass-metal frit extends beyond the apertures so spheres are not needed. See, FIGS. 2b-2c.

Referring back to FIG. 1, the biasing and output terminal or pads 110, 120, 130, 140 are depicted. These areas can be metalized areas which form large contact areas for the appropriate terminals of the Wheatstone bridge 300 configuration. These terminals are shown in FIG. 3 as 110, 120, 130, and 140. Thus as seen from FIG. 3, piezoresistors 150, 155 associated with the active diaphragm 125 can form one-half of the Wheatstone bridge 300, while piezoresistors 160, 165 associated with the reference diaphragm 135 can form the other half of the Wheatstone bridge 300.

In this configuration, the bridge 300 will provide an output at terminals 120, 130 that is strictly responsive to pressure and not vibration or acceleration. A conventional biasing voltage is applied to the bridges via terminals 110, 140 with either terminal serving as a point of reference potential and the other terminal receiving operating potential. There is also shown a span resistor 305 associated with the bridge, which operation is well known in the prior art. The design and fabrication of such a device is disclosed in the '154 patent.

Conventionally, to form the Wheatstone bridge 300 shown in FIG. 3, a physical (and electrical) connection is required between the piezoresistors 150, 155 associated with the active diaphragm 125, and those 160, 165 associated with the reference diaphragm 135. These connections dictate that there is a physical break 122 between circuit traces (76 and 78) from one set of piezoresistors 150, 155 to the other set of piezoresistors 160, 165 cross the centerline AA of the wafer 109. This gap 122, while thin, has appreciable thickness. This leadless technology is discussed in the commonly assigned U.S. Pat. No. 5,955,771, entitled, "SENSOR FOR USE IN HIGH VIBRATION APPLICATIONS AND METHODS FOR FABRICATING SAME."

When the contact glass 205 is placed over the chip the surface irregularity caused by this gap 122 creates a leak path. Because in a differential sensor there is generally a pressure differential between the active diaphragm 125 and the reference diaphragm 135, pressure may leak between the diaphragms 125,135 causing inaccuracies in the ability of the device to cancel out acceleration effects.

Failure of the hermetic chamber 215 can expose one or both sides of the reference diaphragm 135 to atmospheric and/or the applied pressure. When this happens, the signal generated through the reference diaphragm 135 is no longer limited to non-pressure effects. Failure of the chamber 215, therefore, renders the sensor 100 uncompensated, reducing its accuracy.

The present invention involves three different ways to prevent this leak path in a differential acceleration compensated pressure transducer.

Method 1

Figure 4A:
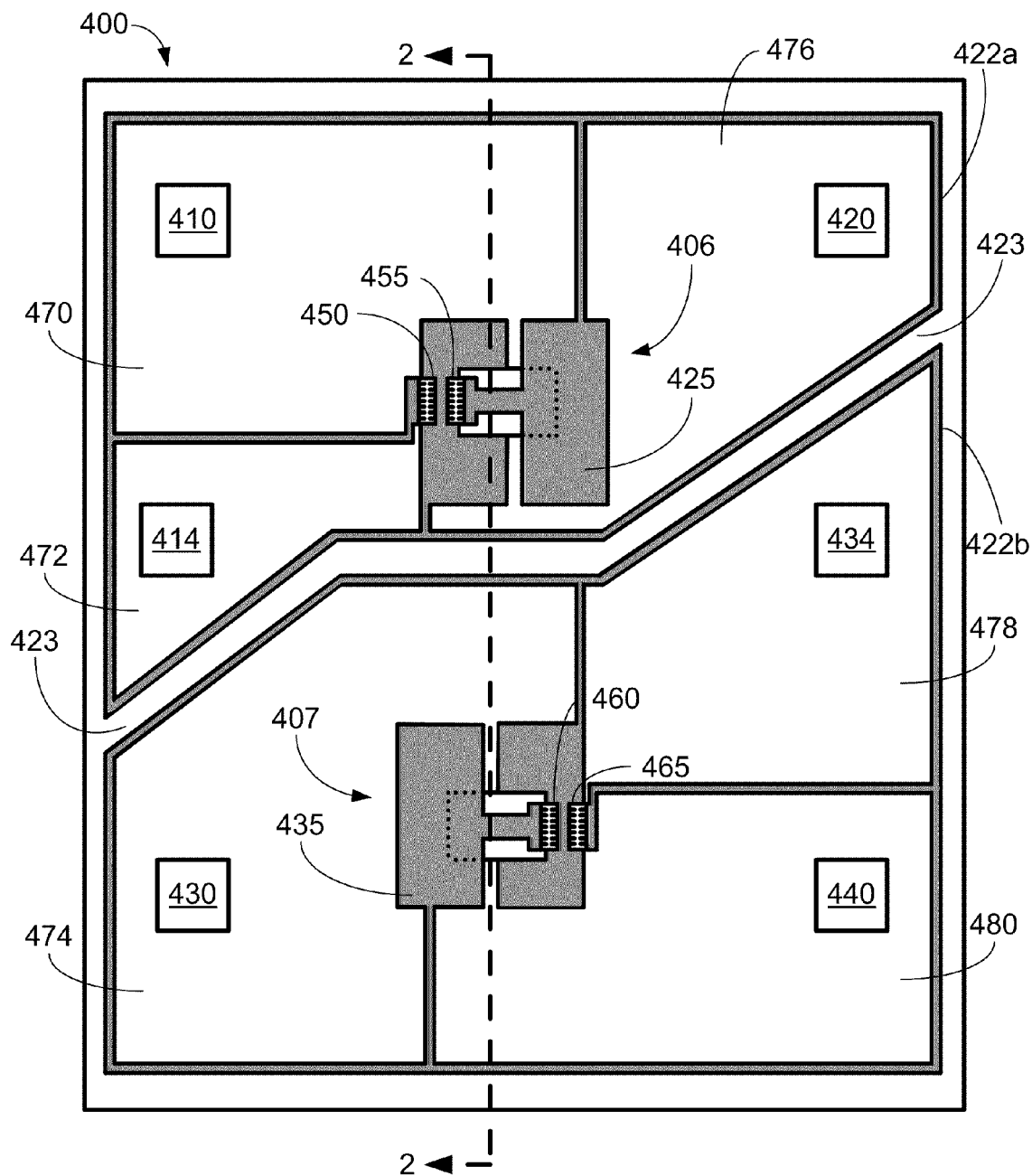
FIG. 4a depicts a schematic of an isolated, compensated pressure sensor, in accordance with some embodiments of the present invention.
Figure 4B:
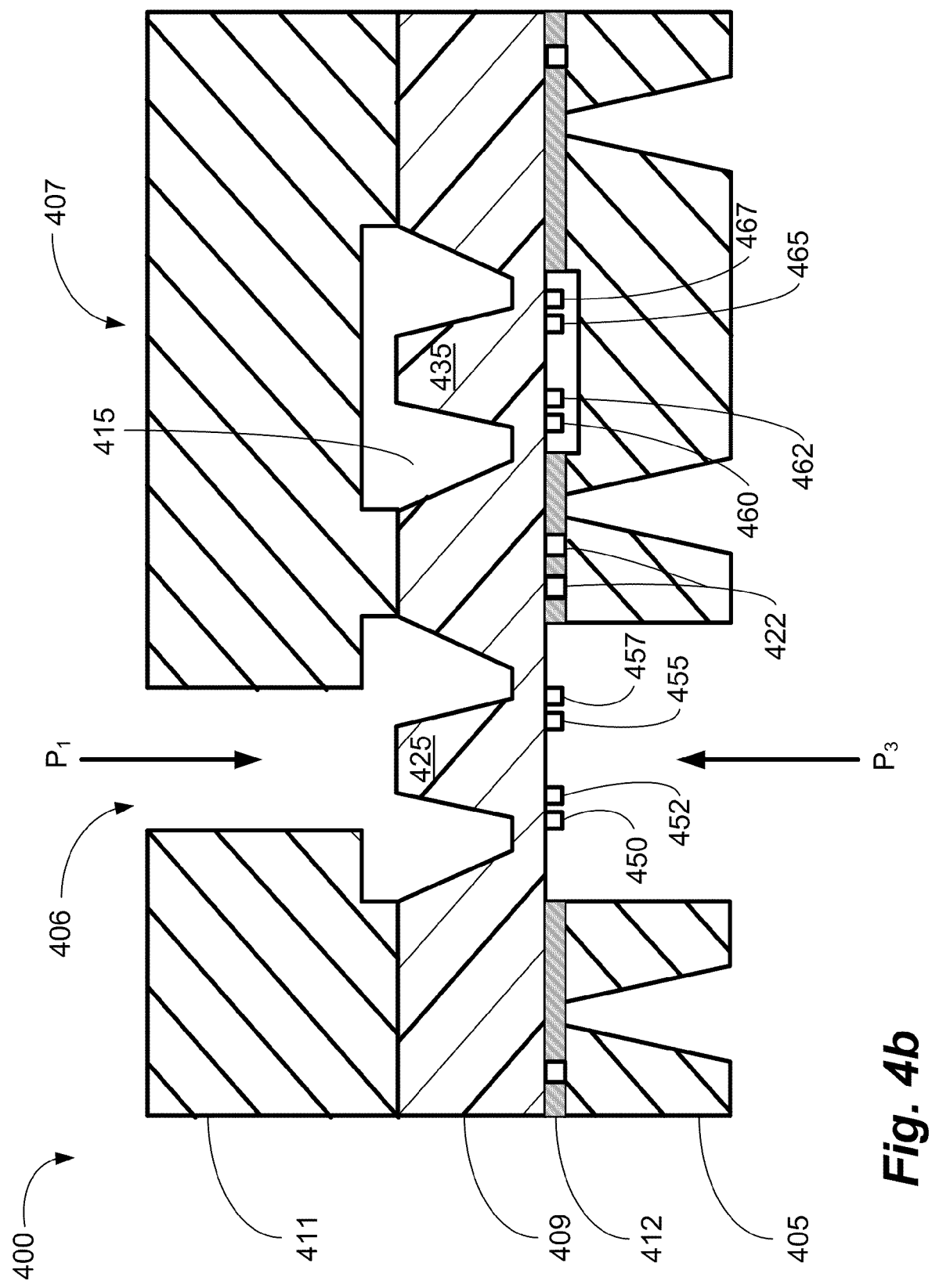
FIG. 4b depicts a cross-sectional view of the isolated, compensated pressure sensor of FIG. 4a, in accordance with some embodiments of the present invention.

As shown in FIGS. 4a and 4b, embodiments of the present invention can comprise a sensor 400 comprising a first pressure sensor 406 and a second pressure sensor 407, both of which can be formed and integrated on the same chip 409. The device 400 can comprise two separate, deflectable diaphragms 425, 435. Each diaphragm 425, 435 can contain at least two piezoresistors 450, 455, 460, 465 (i.e., piezoresistors 450, 455 for diaphragm 425 and piezoresistors 460, 465 for diaphragm 435).

Additionally, the chip 409 can comprise six contact pads, or connectors 410, 414, 420, 430, 434, 440 (as opposed to four), which can enable the piezoresistors 450, 455 for the diaphragm 425 and the piezoresistors 460, 465 for the diaphragm 435 to be electrically isolated. The circuit nodes of the Wheatstone bridge include six oversized P+ diffused silicon electrical contact areas 470, 472, 474, 476, 478, 480 which are mainly located in non-active areas of the wafer 409. These contact areas 470, 472, 474, 476, 478, 480 project from the piezoresistors 450, 455, 460, 465 to the metal contacts 410, 414, 420, 430, 434, 440. The metal contacts 410, 414, 420, 430, 434, 440 within the contact area are preferably rectangular in shape, although other shapes may be utilized.

The chip 409 can further comprise one or more isolation troughs, or moats 422a, 422b, to enable the diaphragms 425, 435 and the contacts 410, 414, 420, 430, 434, 440 to be physically isolated on the chip 409. A first trough 422a can be formed around the first sensor 406 and a second trough 422b can be formed around the second sensor 407.

The sensor 400 can further comprise a bridge 423 disposed between the isolation moats 422a, 422b. The bridge 423, like the contact areas 470, 472, 474, 476, 478, 480 can comprise an area of additional P+ silicon material. The bridge 423 and the contact areas 470, 472, 474, 476, 478, 480, therefore, combine to form a substantially smooth sealing layer 412 across the chip 409. The sealing layer, or surface 412, formed by the bridge 423 and the contact areas 470, 472, 474, 476, 478, 480 can provide a substantially smooth surface onto which the contact glass 405 can be bonded. This substantially seals the active diaphragm 425 from the reference diaphragm 435 preventing pressure leaks therebetween.

FIG. 4b is a cross-section of the sensor 400 taken through line 2-2 of FIG. 4a. The sensor 400 can comprise two diaphragms: an active diaphragm 425 and a reference diaphragm 435. Each diaphragm 425, 435 can contain two sets of piezoresistors. For example, diaphragm 425 can contain piezoresistors 450, 455 as well as piezoresistors 452, 457. Piezoresistors 452, 457 are not used but can be provided for redundancy or for additional purposes. Similarly, diaphragm 435 contains piezoresistors 460, 462, 465, 467, with piezoresistors 462, 467 provided for redundancy or additional purposes. In this configuration, piezoresistors 450, 455, 462, 467 decrease with positive normal stress applied to the respective diaphragms 425, 435 and piezoresistors 452, 457, 460, 465 increase with positive normal stress applied to these diaphragms 425, 435.

The sensor 400 can further comprise a common substrate 409, which can be fabricated from, for example and not limitation, silicon, and can form the base for the sensor 400. Each diaphragm 425, 435 can comprise a thinned area formed in the chip, or wafer 409, which is capable of deflecting upon application of the suitable force or pressure (e.g., $P_1$). The fabrication of such diaphragms as 425, 435 on a silicon wafer 409, for example, is well known, though other materials are contemplated. The sensor can further comprise a cover 411 bonded to the substrate 409 to form the hermetic chamber 415 for the reference sensor 407.

Figure 5:
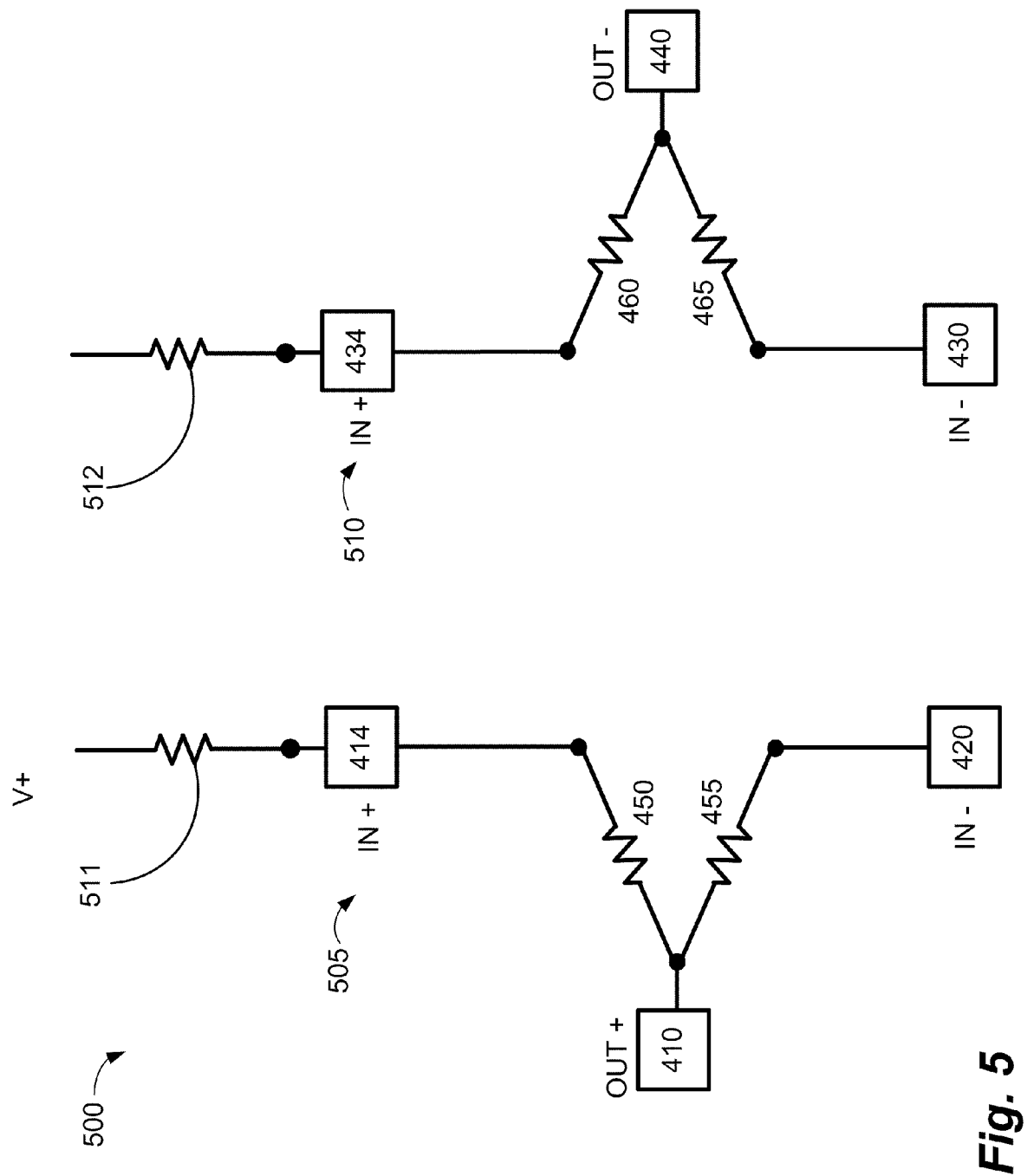
FIG. 5 depicts a wiring diagram for an isolated Wheatstone bridge used in the isolated, compensated pressure sensor of FIGS. 4a and 4b, in accordance with some embodiments of the present invention.

As shown in FIG. 5, in some embodiments, the chip 409 can comprise two distinct half bridge circuits 505, 510 which are not electrically connected together on the chip 409. In this way a P+ layer 423 can be patterned to totally isolate the first pressure sensing device 406 from the second pressure sensing device 407; and more specifically, the reference diaphragm 435 from the active diaphragm 425. Because this additional P+ trace 423 must completely isolate the two diaphragms 425, 435 from each other it is not possible to electrically connect the two half bridges 505, 510 together and this must be done off of the chip 409. The moats, or gaps 422a, 422b, act to isolate the two half bridges 505, 510 from each other and from the surrounding P+ sealing area 423.

The P+ trace 423 can create a smooth surface onto which the contact glass 405 can be bonded to separate the two diaphragms 425, 435 completely. The P+ trace 423 is made as part of the same P+ layer as the piezoresistors 450, 455, 460, 465, 552, 557, 562, 567 and so presents a smooth, substantially level bonding surface 412 for the contact glass 405.

The biasing and output terminal or pads 410, 414, 420, 430, 434, 440 are depicted. These areas can be metalized areas which form large contact areas for the appropriate terminals of an isolated Wheatstone bridge 500 configuration. In other words, the additional terminals 414, 434 obviate the need for the two halves of the Wheatstone bridge 505, 510 to share common terminals. This, in turn, precludes the need for internal electrical connections to connect one set of piezoresistors 450, 455 to the other set of piezoresistors 460, 465.

Because the two halves of the Wheatstone bridge 505, 510 are now electrically isolated on the chip 409 by the P+ trace 423 it is necessary to wire them off the chip 409. An unexpected advantage of this isolation is that it allows for additional of separate span resistors 511, 512 to each half of the bridge 505, 510. This allows for any small amount of difference between the sensitivities of the two half bridges 505, 510 to be compensated for.

Referring back to FIG. 4b, the elimination of electrical components and/or contacts (e.g., interconnect 122) between the diaphragms 425, 435 can enable a larger and smoother contact area 412 between the chip 409 and the contact glass 405. This can increase the area of contact and improve adhesion between the chip 409 and the contact glass 405, thus improving sealing between the two diaphragms 425, 435.

Thus as seen from FIG. 5, piezoresistors 450, 455 associated with deflectable diaphragm 425 form an active half bridge 505, while piezoresistors 460, 465 associated with the deflectable diaphragm 435 form a reference half bridge 510. Rather than sharing input and output terminals, as in FIG. 3, however, the additional pads 414, 434 enable each side of the bridge 505, 510 to have separate inputs 414, 420, 430, 434 and separate outputs 410, 440. The outputs 410, 440 of the two half bridges 505, 510 can then be combined externally to form a compensated Wheatstone bridge 500.

In this configuration, the bridges 505, 510 can be externally combined to provide an output that is strictly responsive to pressure and is not responsive to non-pressure effects. A conventional biasing voltage can be applied to the bridges 505, 510 via terminals 414, 420, 430, 434 with either set of terminals serving as a point of reference potential and the other terminals receiving operating potential.

Method 2

Figure 6A:
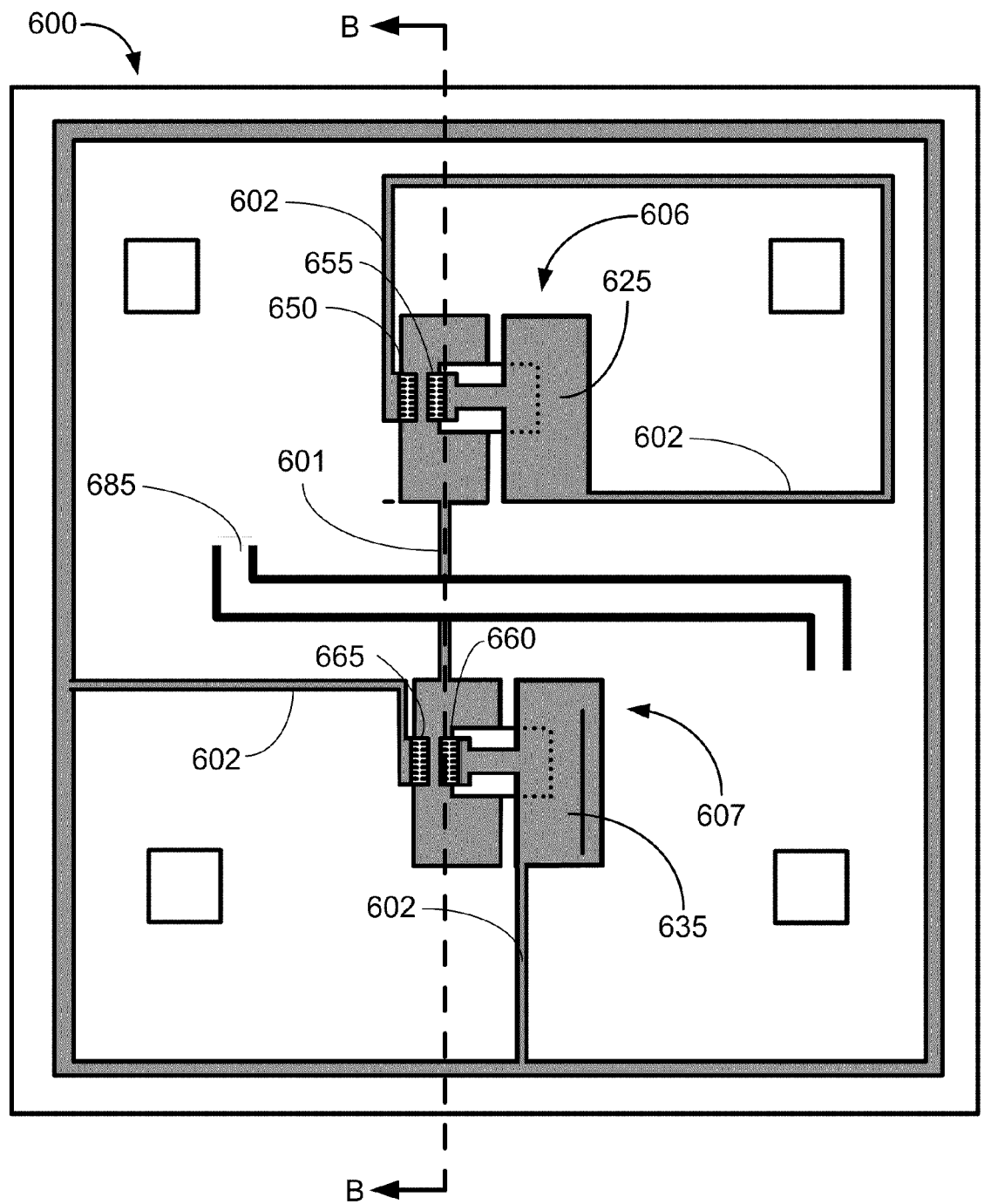
FIG. 6a depicts a schematic of a compensated pressure sensor using a P+ sealing pattern, in accordance with some embodiments of the present invention.

As shown in FIG. 6a, embodiments of the present invention can further comprise a sensor 600 comprising two pressure sensing devices 606, 607 disposed on a continuous chip 609. The piezoresistors 650, 655, 660, 665 can be connected to form a Wheatstone bridge. As discussed above, however, the gaps 601, 602 between the interconnects form possible leak paths between the two diaphragms 625, 635.

In some embodiments, therefore, the chip 609 can have one or more P+ sealing patterns 685. The sealing patterns 685 can be areas of P+ silicon that act to bridge the gaps 601, 602 between the pressure sensing devices 606, 607. The P+ sealing pattern 685 can provide a smooth surface for the contact glass to enable a pressure seal to be created between the two pressure sensing devices 606, 607, and thus between the two diaphragms 625, 635.

Figure 6B:
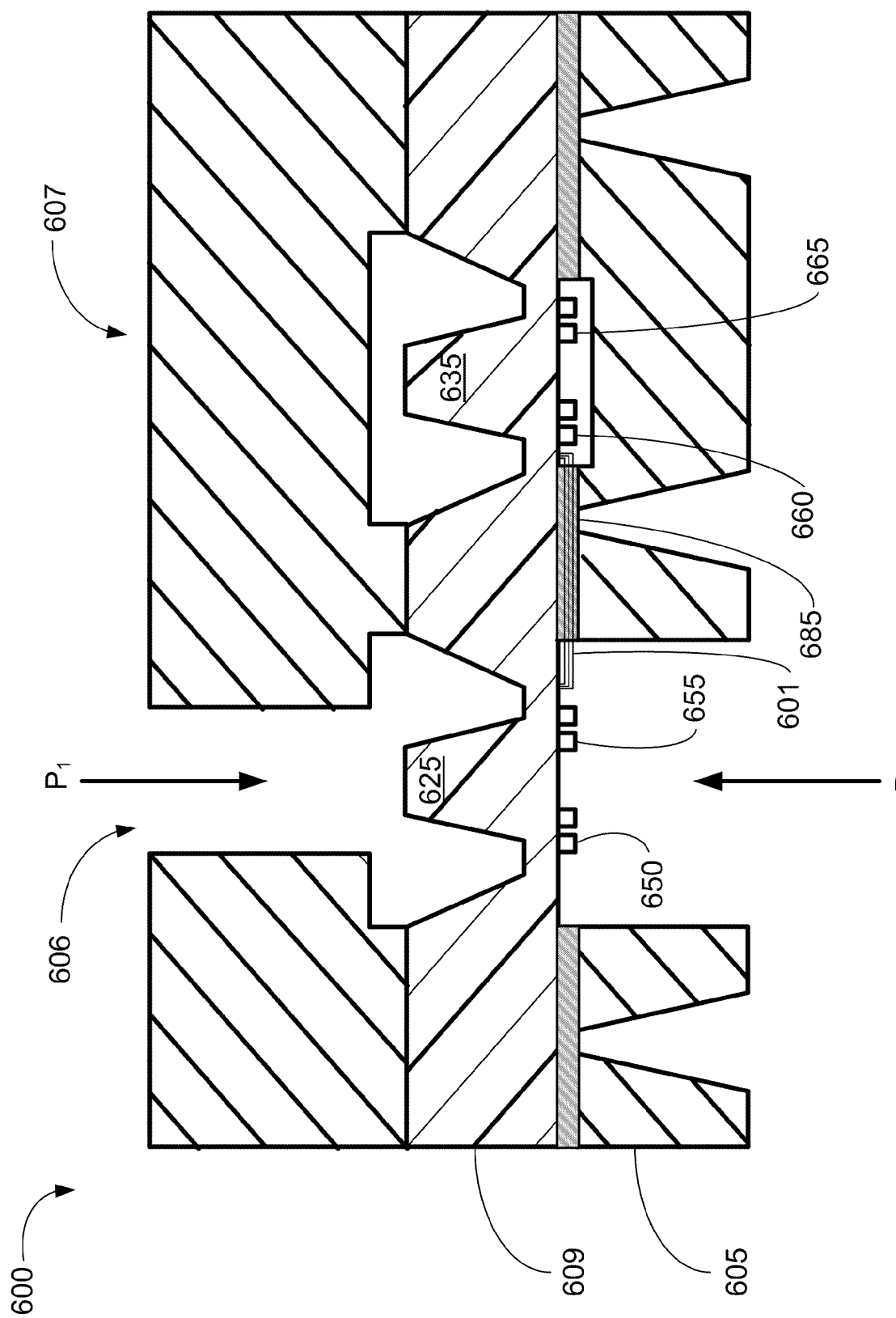
FIG. 6b depicts a cross-sectional view of the compensated pressure sensor of FIG. 6a, in accordance with some embodiments of the present invention.

As shown in FIG. 6b, the gaps in connections 601, 602 between the two pressure transducers 606, 607 can create leak paths on the chip 609. In other words, when the chip 609 is assembled and contact glass 605 is placed over the chip 609, the spaces caused by the gaps 601, 602 can inhibit the formation of a hermetic seal between the two diaphragms 625, 635.

In some embodiments, therefore, the diaphragms 625, 635 can be located on a continuous chip 609 (i.e., not separated by a moat 422) and physical isolation of the diaphragms 625, 635 can be provided by the addition of one or more P+ patterns 685. The additional P+ sealing pattern 685 can be seen as additional dead resistors added to the overall Wheatstone circuit.

FIG. 6a shows one possible configuration for the additional P+ pattern 685 in the chip layout. The P+ pattern 685 can build the chip 609 surfaces up around the gaps 601, 602 to smooth the surface of the chip 609 where it meets the contact glass 605. This can seal the reference diaphragm 625 from the active diaphragm 635 by sealing leak paths along the gaps 601, 602. This enables hermetic isolation of the reference diaphragm 625 from the active diaphragm 635, while simplifying the manufacturing of the chip 609.

The extra P+ pattern 685 is made of the same P+ layer as the piezoresistors 650, 655, 660, 665 and is patterned at the same time. The pattern 685 depicted in FIG. 6 is one of many patterns that could be used and is not intended to be limiting. It is necessary to make this extra P+ pattern 685 long and thin such that is has a high resistance when compared with the bridge resistance such that is does not effect the overall function of the device. In this manner, the pattern 685 can provide a sealing surface across the chip 609, while having little to no effect on the overall electrical circuit.

Method 3

Figure 7:
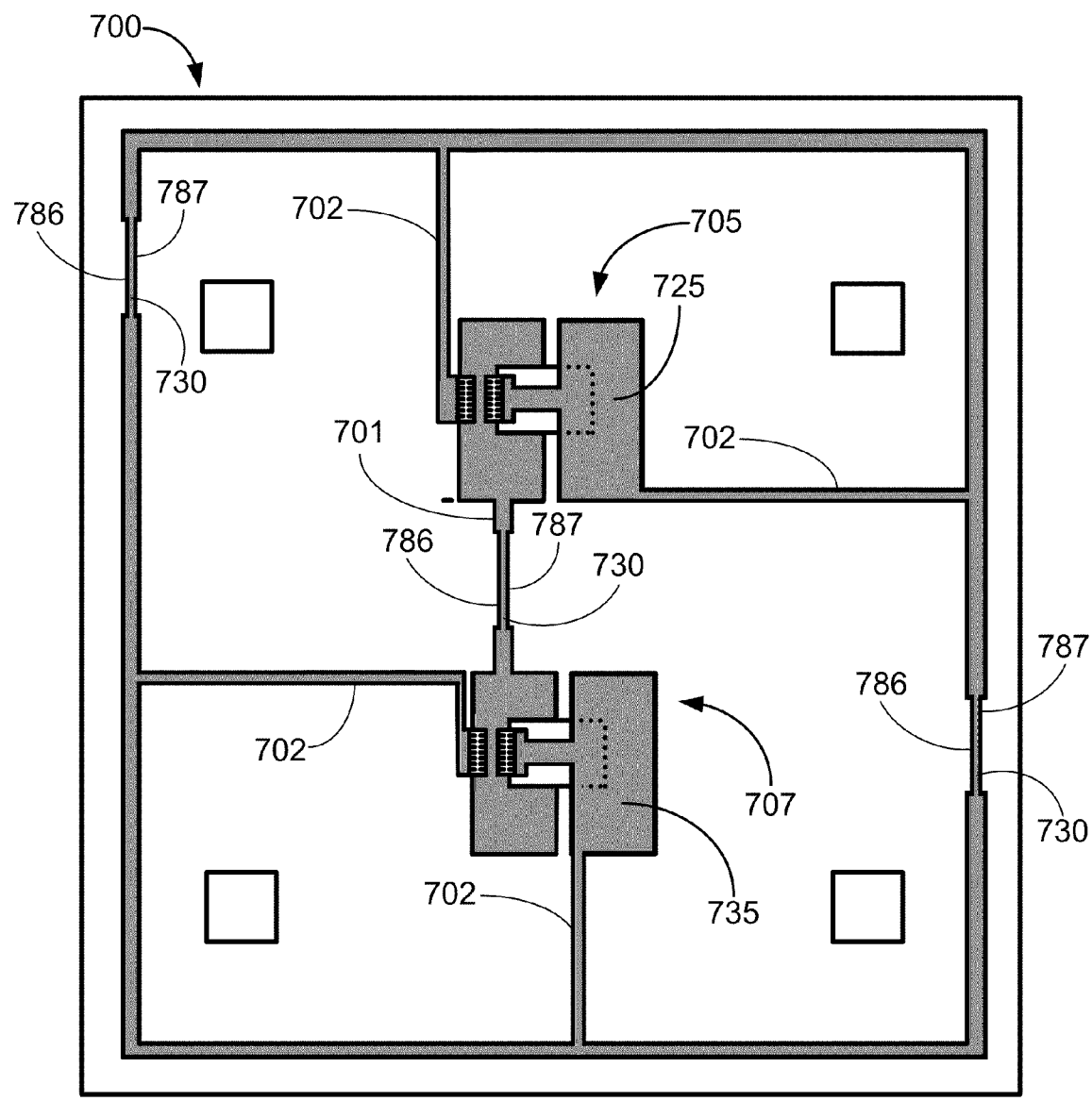
FIG. 7 depicts a schematic of a compensated pressure sensor with narrowed interconnects to facilitate sealing, in accordance with some embodiments of the present invention.

In still other embodiments, shown in FIG. 7, the sensor 700 can comprise two diaphragms 725, 735 separated by narrow gaps 730 between the interconnects 786, 787. In this configuration, all gaps 701, 702 disposed between the active diaphragm 725 and the reference diaphragm 735 can have narrowed portions 730. The narrowed portions 730 can minimize the gap between the two sensors 705, 707. The leak paths at the gaps 730 can be further minimized and/or eliminated using an oxidizing step during manufacture. In other words, after assembling the chip 709, the oxidizing stage of manufacture can be extended such that a non-conductive oxide forms between the two interconnects 786, 787 such as to fill the narrow portion of the gap 730 on the chip 709.

The non-conductive oxide can serve two purposes. First, the non-conductive oxide can electrically isolate the two halves of the Wheatstone bridge preventing short circuits. Second, the non-conductive oxide can build up the gap 730 on the surface of the chip 709 creating a smooth surface onto which the contact glass is bonded. This can enable a full bridge connection on the chip 709, while still enabling the two diaphragms 725, 735 to be sealed by the contact glass.

While several possible embodiments are disclosed above, embodiments of the present invention are not so limited. For instance, while embodiments of the present invention have been disclosed with respect to compensated differential pressure sensors, other types of compensated pressure sensors could be similarly configured without departing from the spirit of embodiments of the invention. In addition, the location and configuration used for various features of embodiments of the present invention can be varied according to a particular chip or diaphragm design that requires a slight variation due to, for example, the materials used and/or space or power constraints. Such changes are intended to be embraced within the scope of the invention.

The specific configurations, choice of materials, and the size and shape of various elements can be varied according to particular design specifications or constraints requiring a device, system, or method constructed according to the principles of the invention. Such changes are intended to be embraced within the scope of the invention. The presently disclosed embodiments, therefore, are considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. A pressure sensor, comprising:
   a chip;
   a first pressure sensing device, disposed on a first portion of the chip;
   a second pressure sensing device, disposed on a second portion of the chip;
   a sealing pattern disposed on a third portion of the chip and between the first pressure sensing device and the second pressure sensing device, and
   a contact glass bonded to the chip in an overlying manner;
   wherein the sealing pattern is used to physically isolate the first pressure sensing device from the second pressure sensing device.

2. The pressure sensor of claim 1, wherein the first pressure sensing device comprising a differential pressure sensor; and
   wherein the second pressure sensing device comprising a reference pressure sensor;
   wherein the differential pressure sensor outputs a first signal proportional to a difference between a first applied pressure and a second applied pressure, wherein the difference includes a non-pressure effects; and
   wherein the reference pressure sensor outputs a second signal substantially proportional to the non-pressure effects.

3. The pressure sensor of claim 2, wherein the first signal and the second signal are combined to create a third signal, wherein the third signal is substantially proportional to the difference between the first applied pressure and the second applied pressure.

4. The pressure sensor of claim 2, wherein the reference sensor is enclosed in a hermetically sealed chamber, wherein a first reference pressure is applied to a first side of the reference sensor and a second reference pressure is applied to a second side of the reference sensor, wherein the first reference pressure is substantially equivalent to the second reference pressure.

5. The pressure sensor of claim 1, further comprising:
   a first set of three contacts disposed on the chip and electrically connected to the first pressure sensing device to form a first isolated half of Wheatstone bridge; and
   a second set of three contacts disposed on the chip and electrically connected to the second pressure sensing device to form a second isolated half of the Wheatstone bridge; and
   wherein the first set of contacts and the second set of contacts are used to operate the Wheatstone bridge.

6. The pressure sensor of claim 5, further comprising:
   a first span resistor electrically connected to the first isolated half of the Wheatstone bridge; and
   a second span resistor electrically connected to the second isolated half of the Wheatstone bridge;
   wherein the first span resistor and second span resistor are used to compensate for a difference in a sensitivity of the first isolated half of the Wheatstone bridge and a sensitivity of the second isolated half of the Wheatstone bridge.

7. The pressure sensor of claim 1, further comprising one or more isolation moats, disposed on the chip, to physically isolate the first pressure sensing device from the second pressure sensing device.

8. The pressure sensor of claim 7, further comprising:
a first isolation moat disposed on the chip and formed around the first pressure sensing device; and
a second isolation moat disposed on the chip and formed around the second pressure sensing device.

9. The pressure sensor of claim 1, wherein the sealing pattern is used to electrically isolate the first pressure sensing device from the second pressure sensing device.

10. The pressure sensor of claim 1, wherein the sealing pattern is used to physically isolate the first pressure sensing device from the second pressure sensing device by creating a seal between the contact glass and the chip.

11. A pressure sensor, comprising:
a chip;
a first deflectable diaphragm, disposed on a first portion of the chip;
a first set of two or more piezoresistors disposed on the first deflectable diaphragm, wherein the first set of two or more piezoresistors are used to measure a deflection of the first deflectable diaphragm;
a second deflectable diaphragm, disposed on a second portion of the chip, wherein the second deflectable diaphragm is enclosed in a hermetically sealed chamber, wherein a first reference pressure is applied to a first side of the second deflectable diaphragm and a second reference pressure is applied to a second side of the second deflectable diaphragm, wherein the first reference pressure is substantially equivalent to the second reference pressure;
a second set of two or more piezoresistors disposed on the second deflectable diaphragm, wherein the second set of two or more piezoresistors are used to measure a deflection of the second deflectable diaphragm;
an interconnect for electrically connecting the first set of two or more piezoresistors to the second set of two or more piezoresistors to form a Wheatstone bridge;
a contact glass bonded to the chip in an overlying manner; and
a sealing pattern disposed on the chip to provide a sealing surface for the contact glass and to prevent pressure leaks between the first deflectable diaphragm and the second deflectable diaphragm.

12. The pressure sensor of claim 11, wherein the output of the Wheatstone bridge is substantially proportional to a difference between a first applied pressure and a second applied pressure.

13. The pressure sensor of claim 11, further comprising:
one or more electrical contacts, disposed on the chip, for providing a first connection to the first set of two or more piezoresistors and a second connection to the second set of two or more piezoresistors; and
one or more gaps for electrically isolating each of the one or more electrical contacts;
wherein the sealing pattern forms a sealing surface for the contact glass to prevent a pressure leak along the one or more gaps.

14. The pressure sensor of claim 11, wherein the chip comprises silicon.

15. The pressure sensor of claim 11, wherein each of the first deflectable diaphragm and the second deflectable diaphragms comprise a thinned areas in the chip.

16. A method of manufacturing a pressure sensor, comprising:
disposing a first deflectable diaphragm on a first portion of a chip;
disposing a second deflectable diaphragm on a second portion of the chip;
mounting a first set of one or more piezoresistors on the first diaphragm;
mounting a second set of one or more piezoresistors on the second diaphragm;
connecting the first set of piezoresistors to the second set of piezoresistors using one or more interconnects having one or more gaps between the one or more interconnects to provide electrical isolation, wherein each of the one or more gaps comprising one or more narrowed portions disposed between the first deflectable diaphragm and the second deflectable diaphragm;
oxidizing the chip to form a non-conductive oxide layer to seal over the one or more narrowed portions of the one or more gaps to prevent pressure leaks between the first diaphragm and the second diaphragm on the chip; and
bonding a contact glass to the surface of the non-conductive oxide layer.

17. The method of manufacture of claim 16, wherein
the first deflectable diaphragm is exposed to one or more applied pressures; and
the second deflectable diaphragm is enclosed in an hermetically sealed chamber such that it measures only non-pressure effects.

* * * * *